(12) United States Patent
Niedermeyer et al.

(10) Patent No.: US 9,218,515 B2
(45) Date of Patent: Dec. 22, 2015

(54) RADIO FREQUENCY IDENTIFICATION COMMUNICATION AND APPLICATIONS THEREOF

(76) Inventors: Brian Joseph Niedermeyer, Portland, OR (US); Terrence Patrick Niedermeyer, Portland, OR (US)

( * ) Notice: Subject to any disclaimer, the term of this patent is extended or adjusted under 35 U.S.C. 154(b) by 582 days.

(21) Appl. No.: 13/410,115

(22) Filed: Mar. 1, 2012

(65) Prior Publication Data

US 2012/0224076 A1 Sep. 6, 2012

Related U.S. Application Data

(60) Provisional application No. 61/448,561, filed on Mar. 2, 2011.

(51) Int. Cl.
| | | |
|---|---|---|
| *G05B 19/00* | (2006.01) | |
| *G06K 7/01* | (2006.01) | |
| *H04N 5/232* | (2006.01) | |
| *G06K 17/00* | (2006.01) | |
| *G06Q 30/00* | (2012.01) | |

(52) U.S. Cl.
CPC *G06K 7/01* (2013.01); *G06K 17/00* (2013.01); *G06Q 30/00* (2013.01); *H04N 5/232* (2013.01)

(58) Field of Classification Search
None
See application file for complete search history.

(56) References Cited

U.S. PATENT DOCUMENTS

| | | | |
|---|---|---|---|
| 4,405,829 A | 9/1983 | Rivest et al. | |
| 6,327,570 B1 | 12/2001 | Stevens | |
| 6,396,537 B1 | 5/2002 | Squilla et al. | |
| 6,937,154 B2 | 8/2005 | Zeps et al. | |
| 7,034,683 B2 | 4/2006 | Ghazarian | |
| 7,076,441 B2 | 7/2006 | Hind et al. | |
| 7,382,259 B2 | 6/2008 | Yun | |
| 7,511,619 B2 | 3/2009 | Allen | |
| 7,746,275 B2 | 6/2010 | Nagino et al. | |
| 7,843,334 B2 | 11/2010 | Kumagai et al. | |
| 2004/0201738 A1 | 10/2004 | Moores, Jr. et al. | |
| 2006/0158533 A1 | 7/2006 | Brahmbhatt et al. | |
| 2006/0180647 A1 | 8/2006 | Hansen | |
| 2007/0120647 A1* | 5/2007 | Min et al. | 340/10.1 |
| 2007/0187266 A1* | 8/2007 | Porter et al. | 206/232 |
| 2009/0121843 A1* | 5/2009 | Bauchot et al. | 340/10.31 |
| 2009/0171786 A1* | 7/2009 | Kuo et al. | 705/14 |
| 2010/0019482 A1 | 1/2010 | Kumagai et al. | |
| 2010/0060927 A1* | 3/2010 | Ichikawa et al. | 358/1.15 |
| 2010/0153171 A1* | 6/2010 | Erhart et al. | 705/9 |

FOREIGN PATENT DOCUMENTS

| | | |
|---|---|---|
| CN | 201035599 Y | 3/2008 |
| CN | 101374230 A | 2/2009 |

(Continued)

*Primary Examiner* — Ojiako Nwugo
(74) *Attorney, Agent, or Firm* — Schwabe, Williamson & Wyatt

(57) ABSTRACT

Embodiments of the present disclosure describe devices, methods, computer-readable media and system configurations for communicating and utilizing data received in radio frequency identification ("RFID") signals to perform various actions. For example, a query signal may be transmitted to a plurality of RFID tags associated with a plurality of objects. A plurality of reply signals may be received from the plurality of RFID tags. Various actions may be performed based on one or more of the reply signals. In various embodiments, an RFID query device may include components such as a camera to capture image data and/or a global positioning system ("GPS") component. Data from one or more of these components may be used in conjunction with received RFID data to perform various actions. Other embodiments may be described and/or claimed.

15 Claims, 8 Drawing Sheets

(56) References Cited

FOREIGN PATENT DOCUMENTS

| GB | 2420052 | A | 5/2006 |
| JP | 2006268490 | A | 10/2006 |
| WO | 2010041778 | A1 | 4/2010 |

* cited by examiner

RADIO FREQUENCY IDENTIFICATION COMMUNICATION AND APPLICATIONS THEREOF

CROSS REFERENCE TO RELATED APPLICATIONS

The present application claims priority to U.S. Provisional Patent Application No. 61/448,561, filed Mar. 2, 2011, entitled "Radio Frequency Communication and Applications Thereof," the entire disclosure of which is hereby incorporated by reference in its entirety.

TECHNICAL FIELD

Embodiments herein relate to the field of wireless communications, and more specifically, to applications of radio frequency identification ("RFID") technology.

BACKGROUND

RFID is a communication technology in which RFID tags may be associated with (e.g., placed on or inside of, affixed to, packaged with) objects and remotely queried, tracked and/or identified using radio frequency waves. An RFID query device may emit radio frequency waves to which RFID tags may respond. Some RFID tags may be considered "active" because they operate under their own power. Other RFID tags may be considered "passive" because they do not have their own power source and instead are powered by a signal received from an RFID query device. In either case, an RFID tag may receive the radio frequency waves emitted by the RFID query device and may respond thereto.

An RFID query device may be any device that includes one or more components to exchange RFID query signals with one or more RFID tags. A non-exclusive list of devices that may function as RFID query devices includes mobile telephones, smart phones, portable computers, scanners, entryway devices (e.g., to read name badges with RFID tags), cameras, other portable electronic devices, and so forth.

Near Field Communication ("NFC") is a subset of RFID that limits the range of communications to a close range. NFC may be useful for applications where potentially sensitive data is exchanged between an RFID query device and an RFID tag, such as credit card and passport applications. Longer range applications of RFID may be useful in other applications where data exchanged is not sensitive and/or where RFID tags are likely to be distanced from an RFID query device, such as for animal tracking. Unless otherwise indicated, the term RFID as used herein encompasses NFC.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1:
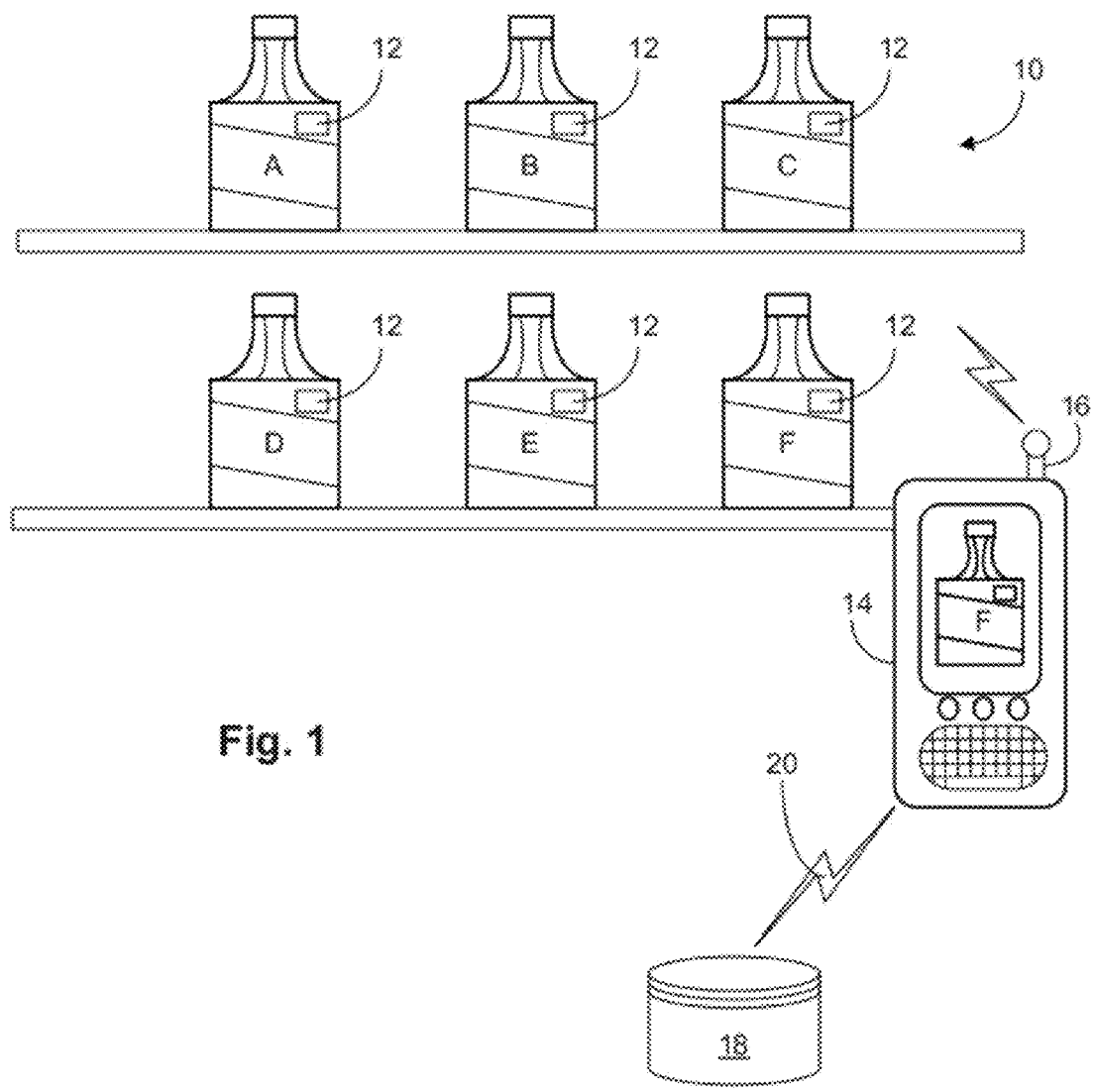
FIG. 1 illustrates an RFID query device as it may be used to query a plurality of objects having RFID tags, in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

In various embodiments, methods, apparatuses, computer-readable media and systems for exchanging RFID data with one or more RFID tags and taking various actions using received RFID data are provided. In various embodiments, a computing system and/or a portable electronic device may be equipped with one or more components of the disclosed apparatuses and/or systems and may be employed to perform one or more methods as disclosed herein.

Radio frequency communication protocols are broadly identified and utilized in embodiments herein, whether or not the signal is modulated by a suitable technique, such as a spread spectrum technique.

In one aspect, methods, systems and devices are provided to query a plurality of RFID tags with an RFID query device and perform one or more actions based on RDIF data received at the RFID query device from the plurality of RFID tags in response to the query.

For example, an RFID query device such as a smart phone may be used to query, e.g., using a broadcast a radio frequency signal, a plurality of objects having a plurality of RFID tags. A user who wishes to obtain more information about a particular object may hold the RFID query device closer to the object of interest than to other objects. The RFID query device may filter all the response RFID signals received from the plurality of objects and determine that the user is interested in the object having an RFID tag that provides the strongest return signal. In some embodiments, the RFID query device may only acknowledge RFID responses meeting a particular criterion, such as reply signals having a strength value that is above a threshold.

An example of this is illustrated schematically in FIG. 1. Objects 10, shown as products labeled A-F, are shown on shelves. Each object 10 has an RFID tag 12. An RFID query device in the form of a smart phone 14 is held closer to the object labeled "F" than to the other objects. Smart phone 14 includes an antenna 16 that broadcasts a signal containing an RFID query. RFID tags in proximity to smart phone 14, including RFID tags 12 on each of the plurality of objects 10, receive the signal containing the RFID query and transmit a reply signal containing RFID data, e.g., about objects 10.

Smart phone 14 may receive reply signals from RFID tags 12 on one or more of the plurality of objects 10. However, because smart phone 14 is closer to object 10 labeled "F" than it is to the other objects 10, the reply signal received from RFID tag 12 of the object 10 labeled "F" may be stronger than those received from RFID tags 12 of the other objects 10 labeled "A"-"E." Using filters, comparisons or other suitable logic, smart phone 14 may identify the strongest reply signal—in this case, the signal from RFID tag 12 of the object 10 labeled "F"—and may determine information about the corresponding object 10. The fact that the strongest signal is received from an RFID tag 12 of a particular object may indicate that the user is more interested in that object 10 than other objects.

In some embodiments, an RFID query device such as smart phone 14 or another device in communication with the RFID query device may determine information about an object based on a reply signal received at the RFID query device. For example, in FIG. 1, smart phone 14 may identify, from a database 18, an object corresponding to RFID data contained in the reply signal smart phone 14 received from RFID tag 12 of the object labeled "F." Database 18 may contain information about objects such as price, nutritional content, product specials, expiration dates, ingredients, applicable recipes, allergens, hyperlinks to pertinent websites, and so forth.

In various embodiments, database 18 may be indexed by RFID data associated with objects 10, so that RFID data received in a reply signal by smart phone 14 from RFID tag 12 may be readily located in database 18. Smart phone 14 may communicate with database 18 via a wireless connection 20 or by any other type of data connection, including a hard wire connection (e.g., a user connects smart phone 14 to a home computer via USB). Information may be exchanged between smart phone 14 and database 18 using any number of communication protocols.

Upon receipt of RFID data from an RFID tag, any number of actions may be performed, by the RFID query device and/or other devices in communication with the RFID query device. For example, an output may be selected, e.g., from a plurality of potential outputs, based at least in part on the received RFID data, and outputted, by the RFID query device or by another device. FIG. 1 depicts such an example, where the output is an image of the object that is displayed to the user of smart phone 14. Other visual output related to the object, such as its price, nutritional information, ingredients, recipes, allergens, and so forth may also be displayed to the user via smart phone 14.

Output may be visual, audio, tactile, olfactory, or a combination thereof. For example, an output such as a targeted advertisement may be selected and presented to the user, e.g., visually on an electronic display on smart phone 14 and/or audibly through a speaker of smart phone 14. The output may be selected based on the user's interest in a particular brand of product (e.g., the object in FIG. 1 labeled "F").

In various embodiments, information about the user of the RFID query device may be conveyed to database 18. For example, the RFID data contained in a reply signal received at smart phone 14 from RFID tag 12 of object 10 nearest smart phone 14 (e.g., having the strongest reply signal) may be associated with the user of smart phone 14 at database 18. Additionally or alternatively, information received from RFID tags 12 of each of the plurality of objects 10 of FIG. 1—and in some cases an indication of which object had the strongest RFID reply signal—may be provided to database 18, for association with the user. A profile of the user may then be created/modified based on the user's interest in or association with particular objects and/or brands.

Figure 2:
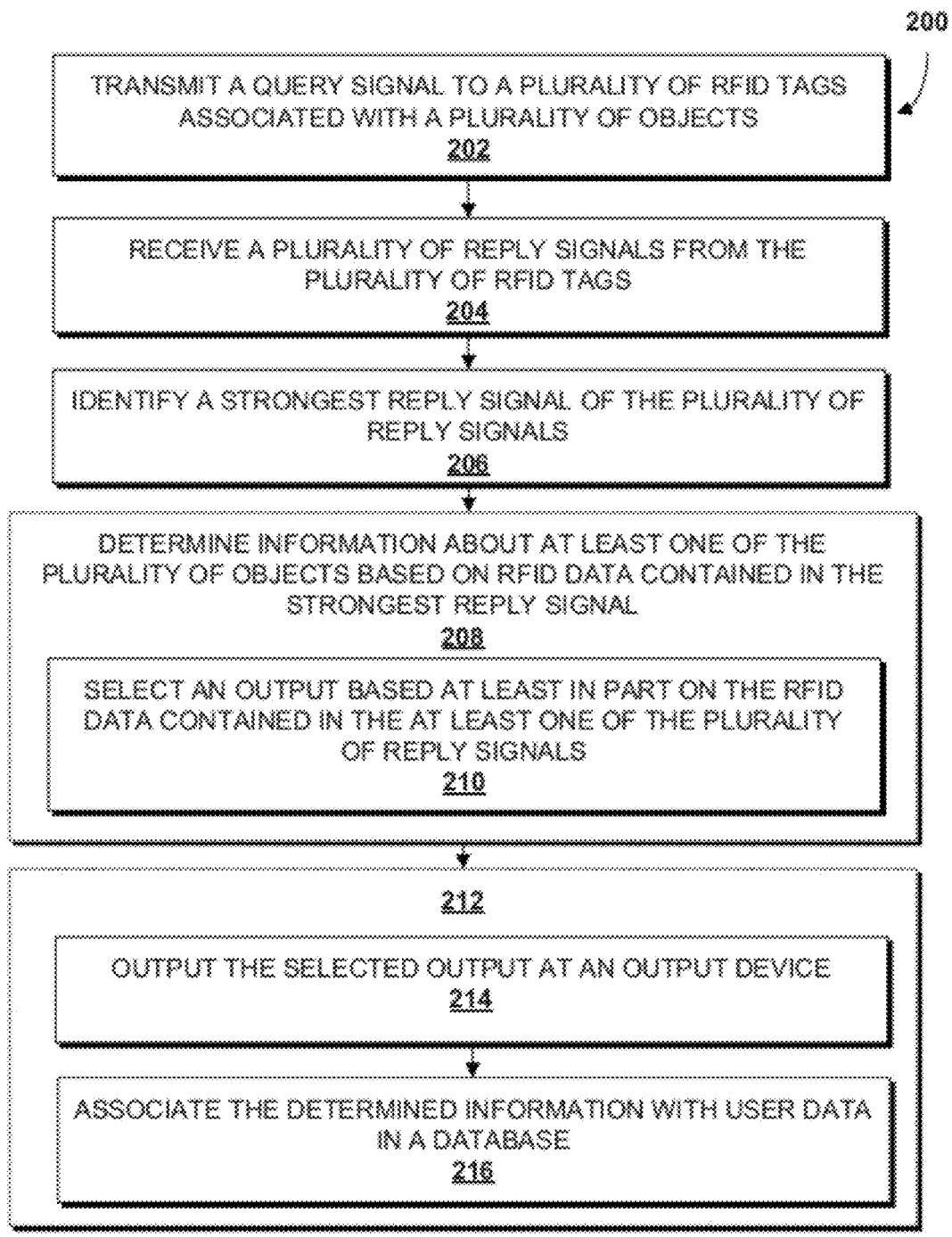
FIG. 2 schematically depicts an example method that may be implemented by various devices, including an RFID query device, in accordance with various embodiments.

An example method 200 that may be implemented by a device such as smart phone 14 in FIG. 1 is schematically depicted in FIG. 2. At 202, a query signal may be transmitted, e.g., by smart phone 14, to a plurality of RFID tags associated with a plurality of objects. At 204, a plurality of reply signals may be received, e.g., by smart phone 14, from the plurality of RFID tags.

At 206, a strongest reply signal of the plurality of reply signals may be identified, e.g., by smart phone 14, using filters or other suitable components. As described above, the strongest reply signal may be received from an RFID tag associated with an object that is closer to the smart phone 14 than other objects having RFID tags.

At 208, information about at least one of the plurality of objects may be determined based on RFID data contained in the strongest reply signal. For example, at 210, an output may be selected, e.g., by smart phone 14 or by another device, from a plurality of outputs.

At 212, various actions may be taken with the information determined at 208. For example, at 214, the output selected at 210 may be output, e.g., on smart phone 14 or by another device. As noted above, the output may be visual, audio, tactile, olfactory, or any combination thereof. Additionally or alternatively, at 216, the information determined at 208 may be associated with user data in a database such as database 18 in FIG. 1.

In various embodiments, the output additionally or alternatively may be selected based on a commonality identified between a plurality of objects having RFID tags. For example, a targeted advertisement may be based on a user's interest in a class of objects.

Figure 3:
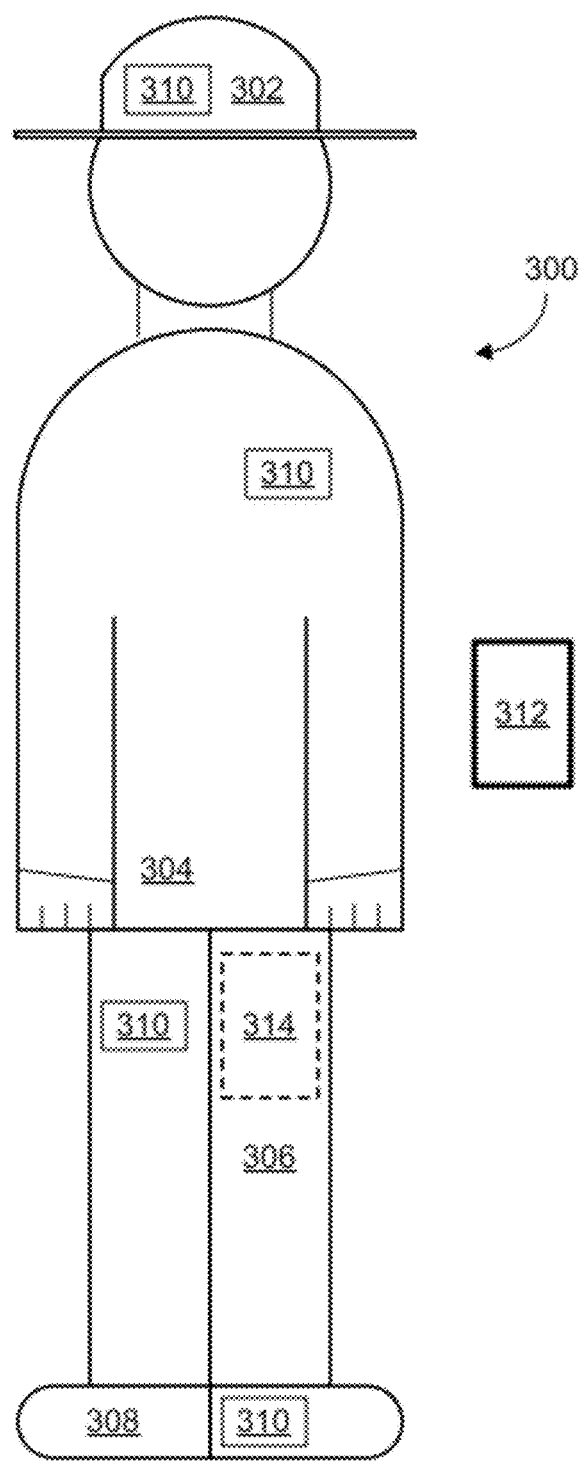
FIG. 3 illustrates an RFID query device as it may be used to query RFID tags on an individual, in accordance with various embodiments.

FIG. 3 depicts an individual 300 wearing a hat 302, a shirt 304, pants 306 and shoes 308. Each of the articles of clothing includes an RFID tag 310. An RFID query device 312 is shown in proximity to individual 300 so that it may broadcast an RFID query that is received at the RFID tags 310 of the various pieces of clothing. RFID tag 310 of each piece of clothing may transmit a response to RFID query device 312 containing RFID data associated with the piece of clothing. For example, RFID tag 310 of hat 302 may return RFID data that may be used to determine information such as the brand of the hat, the original price of the hat, identification of a sports team or organization endorsed on or by the hat, the location where the hat was manufactured, and so forth.

Information obtained using RFID data received from RFID tags 310 on individual 300 may be used to create a user profile, similar to that described above. With the user profile, one or more targeted advertisements may be provided to individual 300. For example, the user profile may reflect a commonality between the objects; e.g., that shirt 304 endorses a sports team from a particular state and hat 302 endorses a musical group from the same state. This may suggest that individual 300 has an affinity for, is from, or lives within that state. Accordingly, output relevant to that state may be selected and provided to individual 300.

In addition to receiving RFID from RFID tags 310 associated with objects possessed by individual 300, in various embodiments, a unique identifier may be obtained from individual 300 and associated with information obtained from RFID tags 310 relating to objects possessed by individual 300. For example, a unique identifier may be obtained from a portable electronic device 314 carried by individual 300, such as a mobile phone, tablet computing device, a camera and so forth. In various embodiments, the unique identifier may be obtained from other objects associated with the user, such as an identification card carried by the user.

In various embodiments, the unique identifier may be usable to provide information to individual 300. For example, the unique identifier may be a MAC address or telephone number associated with a portable electronic device carried by individual 300. Unique identifiers may be obtained from a user using various technologies, including but not limited to RFID (including near field communications), optical communication (e.g., by scanning bar codes), BlueTooth, and so forth.

In various embodiments, a unique identifier may be formed from a combination of various data from multiple objects. For example, a unique identifier may be formed from one or more of RFID data, MAC addresses, radio frequency signatures emitted by portable electronic devices such as cameras carried by the individual, a GPS coordinate, and so forth. In various embodiments, these data may be associated with a digital image of an individual. For example, in various embodiments, a unique identifier including a combination of data may be obtained, e.g., at an automated tell machine ("ATM") or at a checkout line at a store, by one or more of an RFID query device and/or a digital camera. When the individual later is scanned with a subset of the objects that the individual possessed when the unique identifier was obtained, the scanning device (e.g., RFID query device, etc) or another device in communication with the scanning device may use the obtained data to attempt to determine a unique identifier. If less than all the necessary data is obtained, then a confidence level that it was the same individual may be determined.

For example, assume an individual is queried by an RFID device and digitally photographed at an ATM. Assume further that a unique identifier for the individual is formed from a combination of RFID data contained in the individual's shirt, pants, shoes and from a radio frequency signature obtained from a portable electronic device carried by the individual. If the individual is later queried (e.g., by an RFID query device) and it is determined that the same shirt, pants and portable electronic device are present, then a relatively high level of confidence may be associated with a determination that it was the same individual at the second query. In various embodiments, a targeted advertisement may be provided to the individual based on their established profile.

Similar to querying RFID tags on a person, an RFID query device may be placed on a roadway to query RFID tags on passing vehicles and/or passengers in the vehicle to generate profiles of the vehicles and/or passengers. The RFID query device may communicate with advertisement delivery devices (e.g., billboards, radio towers broadcasting radio advertisements to cars, etc.), directly or through one or more databases (e.g., database 18 in FIG. 1). The advertisement delivery devices may provide the driver of the vehicle with a targeted advertisement based on RFID information received from the vehicle.

Figure 4:
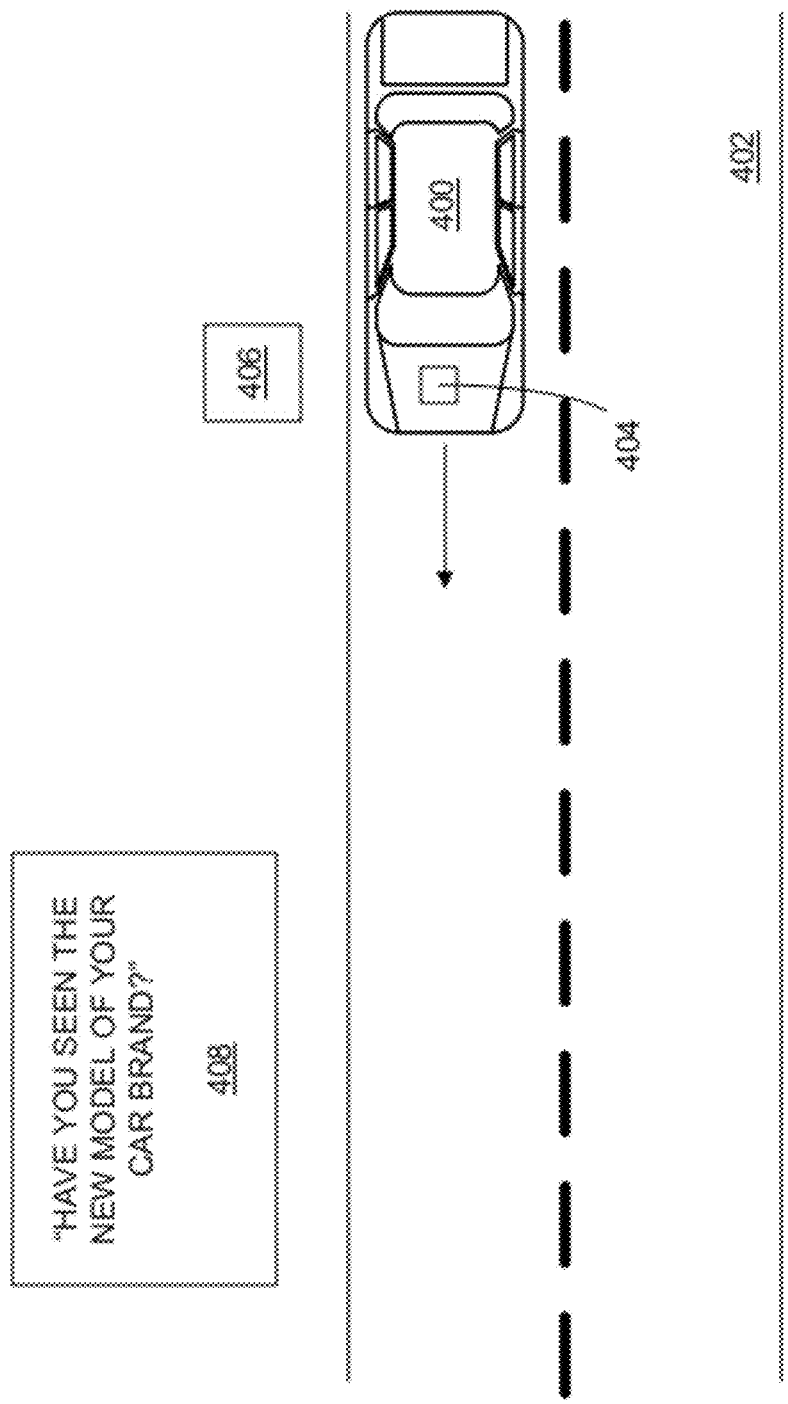
FIG. 4 illustrates a roadside RFID query device and interactive billboard, in accordance with various embodiments.

An example of a roadside RFID query device and interactive billboard is shown in FIG. 4. A vehicle 400 is shown on a roadway 402 moving in the direction of the arrow. Vehicle 400 includes one or more RFID tags 404 that may be configured to provide information about vehicle 400, parts found in vehicle 400, the history of vehicle 400, and so forth, in response to an RFID query signal. One or more RFID query devices 406 may be positioned to the side of roadway 402 or above/over roadway 402 and may be configured to query RFID tags in vehicles such as vehicle 400. As vehicle 400 passes RFID query device 406, the signal broadcast from RFID query device is received and responded to by RFID tag 404. RFID query device 406 may receive this information and communicate (directly or through one or more intermediary computing systems) with an interactive billboard 408 to display an advertisement specifically targeted at the driver of the car. In this example the advertisement asks "Have you seen the new model of your car brand?"

In some embodiments, a determination may be made about a social or economic status of an individual based on objects (or an identified commonality between multiple objects) in which the user shows interest (e.g., FIG. 1), the clothing the user wears (e.g., FIG. 3) and/or a vehicle the user drives (e.g., FIG. 4). If an object in which the individual shows interest, clothing worn by the individual, and/or a vehicle driven by the individual is relatively expensive, a profile created for the individual may reflect relative affluence, or may reflect such preferences. Thus, advertisements relating to luxury or "high end" products may be directed to such an individual (e.g., on interactive billboard 408 in FIG. 4 or at the individual's smart phone 14 in FIG. 1).

On the other hand, if an object in which the individual shows interest, clothing worn by the individual, or a vehicle driven by the individual is relatively inexpensive, then a user profile created for the individual may reflect that the user may be more responsive to advertisements related to discount retailers and/or non-luxury goods.

The embodiments provided above are merely examples, and additional information may be received from RFID tags and incorporated into a profile and/or provide information about user preferences.

In various embodiments, RFID query devices may include other components for obtaining data that may be used in conjunction with RFID data. For example, RFID query devices may be provided with digital cameras, allowing the devices to capture digital image data. In various embodiments, a portion of the captured digital image data may be associated with at least one datum of RFID data received from an RFID tag on an object depicted in the digital image data. This association may be performed and/or facilitated by an RFID query device and/or another device. For example, image processing software may be provided, in an RFID query device (e.g., smart phone 14 of FIG. 1), at a home computer and/or at a computer hosting a database (e.g., database 18), that is configured to process captured digital image data and make various decisions. Various combinations of the digital image data, determinations made about the digital image data by the image processing software, and information obtained from RFID tags by an RFID query device may be used in various applications.

Referring back to FIG. 1, RFID data received by smart phone 14 from RFID tags 12 on objects 10 may be associated with object information in database 18. If a user were to use a camera on smart phone 14 to capture a digital image of objects 10, image processing software may perform object recognition to identify each object within the digital image data and/or portion of the digital image data relating to each object. An identified object/region may be associated with at least one RFID datum of RFID data received from RFID tags 12 on each of the plurality of objects 10. If an object identified by image recognition software does not have an RFID tag, then RFID data may be generated for the object using information in a database.

In some embodiments, all or a portion of captured digital image data may be associated, e.g., by an RFID query device or another device, with one or more hyperlinks based on received RFID data received from RFID tags in the vicinity when the image was taken. For example, a digital image of the plurality of objects 10 of FIG. 1 may be altered so that that each object, or region immediately surrounding each object, is "tagged" so that it operates as a hyperlink to a webpage about the object. A user viewing the digital image may move a cursor over the "tagged" objects to receive an indication that the region is a link and, in some cases, certain information about the object. If the user clicks on the "tagged" object, she may be redirected to a website related to the object. A cursor may be moved to select from multiple tags in various ways, such as with a mouse, a keyboard, or a hands-free controller such as the Kinect™ from Microsoft®.

Hyperlinks relating to an object may be determined in various ways. For example, when an RFID query device receives RFID data from an RFID tag, the RFID query device or a computing system in communication with the RFID query device may search a network such as the Internet using the received RFID data. One or more universal resource locators ("URL") of relevant websites may then be gathered and used to create hyperlinks within a digital image. In some embodiments, one or more relevant URLs may be stored in a database, such as database 18 of FIG. 1, or even provided to an RFID query device by an RFID tag.

Figure 5:
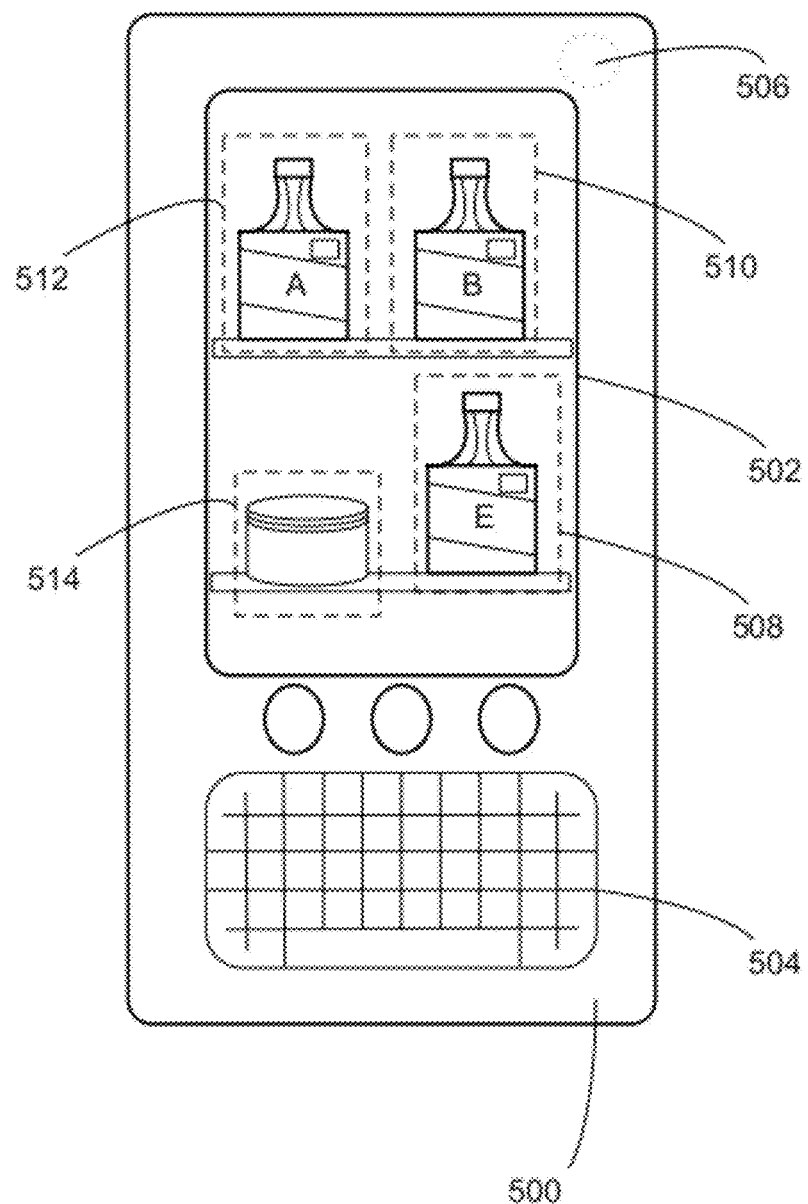
FIG. 5 illustrates a smart phone equipped with an RFID query device and a digital camera, in accordance with various embodiments.

FIG. 5 illustrates an RFID query device in the form of a smart phone 500 having a display 502, an input 504 and a digital camera 506. Digital camera 506 has been used to take a digital image of some objects on shelves and is depicted on display 502. Image processing software executing on smart phone 500 has used object recognition to identify the objects in the digital image and to "tag" those objects with the boxes 508, 510, 512 and 514. In some embodiments, image processing software may recognize objects based purely on visual characteristics of objects. In some embodiments, image processing software may utilize RFID data received from RFID tags on objects in an area (e.g., queried from the objects on a shelf) to narrow down the list of objects that could potentially be shown in the digital image, thereby simplifying object recognition by the image processing software. In various embodiments, tagged objects may be selected to utilize a hyperlink associated with the tagged object to navigate to a website.

In some embodiments, an RFID query device is configured to keep or discard information received from RFID tags based on information in a digital photograph. For example, image processing software (on the RFID query device or elsewhere) may be configured to identify foreground distance in a digital image. Once the foreground is identified, information received from RFID tags on objects in the foreground of the digital image may be acknowledged and utilized as described above. Information received from RFID tags on objects that are not in the foreground may be discarded.

Similarly, because RFID may not depend on line of sight, some objects or other objects containing RFID tags that return information to an RFID query device may not be visible at all in a digital image taken by the device. An RFID query device may use information received from non-visible objects, or in some cases, the RFID query device may discard such information.

As mentioned above, in various embodiments, information such as a unique identifier of an individual may be associated in a database with data received from RFID tags. In various embodiments, an individual's appearance itself, as shown in digital photograph, may be used as an unique identifier. In various embodiments, when a digital image of the individual is posted on a website, the individual may be identified using facial recognition software. In various embodiments, one or more computer systems providing the website may generate targeted advertising directed to viewers of the digital image based on a profile for the individual in the picture (e.g., under an assumption that people viewing the image are likely to have similar interests as the user).

In various embodiments, an RFID query device may be configured to determine a location of an object. For example, an RFID query device may be configured to obtain a global positioning system ("GPS") coordinate of the location of the RFID query device. In some embodiments, one or more RFID query devices may be configured to determine the location of an object using triangulation. In either case, geographic coordinates of the RFID query device, along with other information, such as RFID data returned from RFID tags and/or captured digital image data, may be used in various ways.

For example, while querying an RFID tag associated with an object at a particular location, an RFID query device may obtain a geographic coordinate of that location using GPS. RFID data received at the RFID query device from the RFID tag of the object may then be associated with the geographic coordinate. This information may be communicated to a database as a record of the object having been at that location. In some embodiments, the RFID query device may be configured to generate a timestamp, so that a database record may also reflect when the object was at that location. In some embodiments, the received RFID data may be associated with the timestamp and/or the geographic coordinate and stored in a database record.

In some embodiments, a travel route of the object with an identifier, particularly one that has a unique or semi-unique identifier stored in its RFID tag, may be tracked based on database records having matching identifiers. Information about the travel route may be used for various purposes. A map illustrating the route may be generated, at an RFID query device or elsewhere, with indicators of where a particular item has been detected by RFID query devices.

Figure 6:
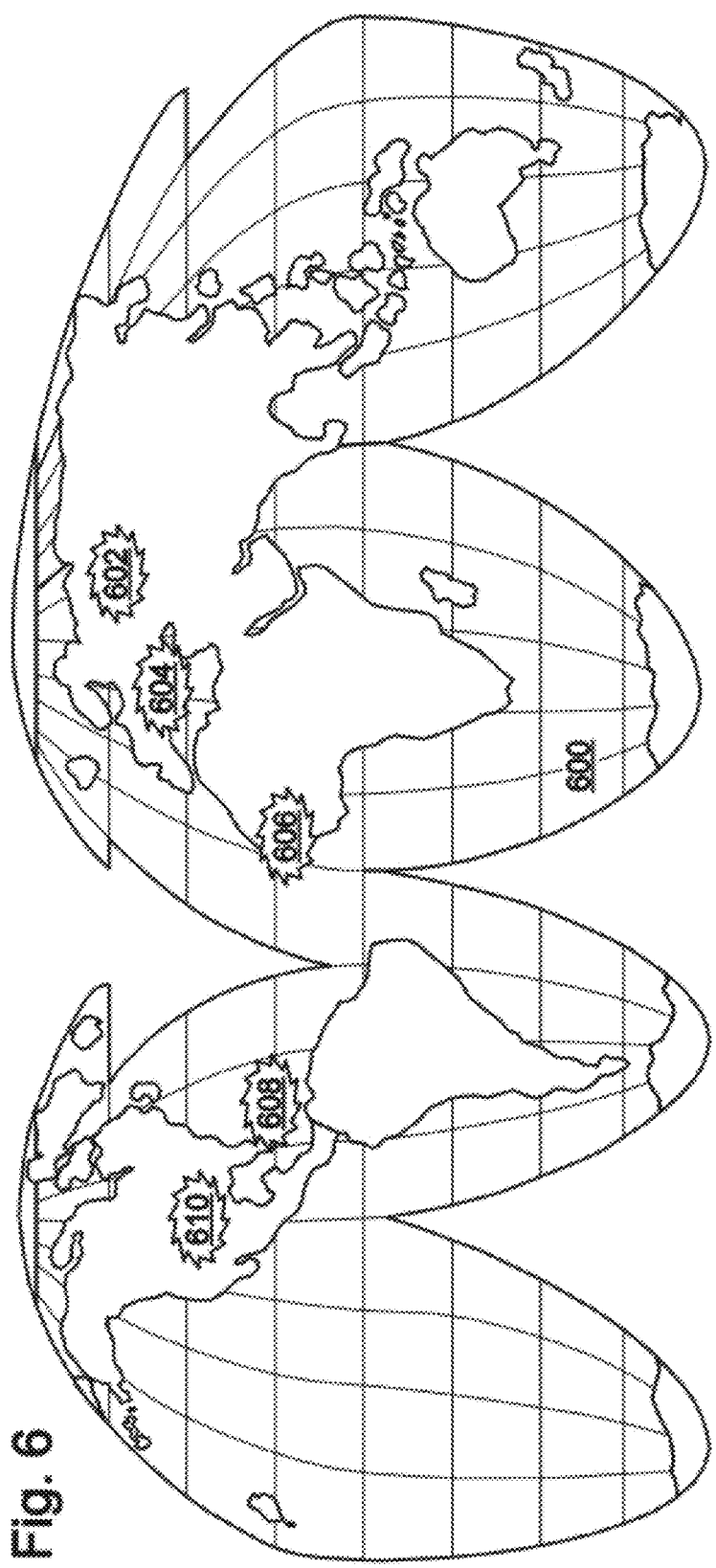
FIG. 6 illustrates a map used to track travel of an object having an RFID tag, in accordance with various embodiments.

An exemplary map 600 is shown in FIG. 6. Map 600 includes indicators at geographic coordinates contained in database records with matching RFID identifiers, providing an indication of locations where an object was identified by RFID query devices. In this example, the tracked object was first detected in Eastern Europe at 602. The tracked object was next detected in Southern Europe at 604. The tracked object was then detected in Western Africa at 606, and then in Cuba at 608, and finally in the United States at 610.

A travel route, locations and timestamps of a particular object may be used to determine or estimate the object's travel velocity. This velocity may be compared to reference velocities of other objects that may be obtained, for example, from customs for various countries or territories. By performing such comparisons, it may be determined whether an object is genuine or counterfeit. For example, RFID tags may be embedded in currency for tracking purposes.

Accordingly, the travel route of FIG. 6 and estimated velocity of the object as it traveled through locations 602-610 may be compared with known and/or legitimate travel routes and expected travel velocities to determine, for instance, whether the object is a counterfeit good. In this example, because the object travelled from Cuba to the United States, a determination may be made that the object was imported illegally.

In some embodiments, multiple RFID query devices may be used cooperatively to track a single object (e.g., a product, a car, a document, etc.) in real time. A first RFID query device may be configured to hand off tracking of an object to a second RFID query device as the object travels away from the first device and towards the second.

For instance, multiple smart phones having RFID components may track an object as it travels within a facility or even in open country. Given the enormous proliferation of mobile telephones throughout the world, this type of tracking may be particularly useful to track objects of critical importance, such as weapons, hazardous chemicals and so forth.

Figure 7:
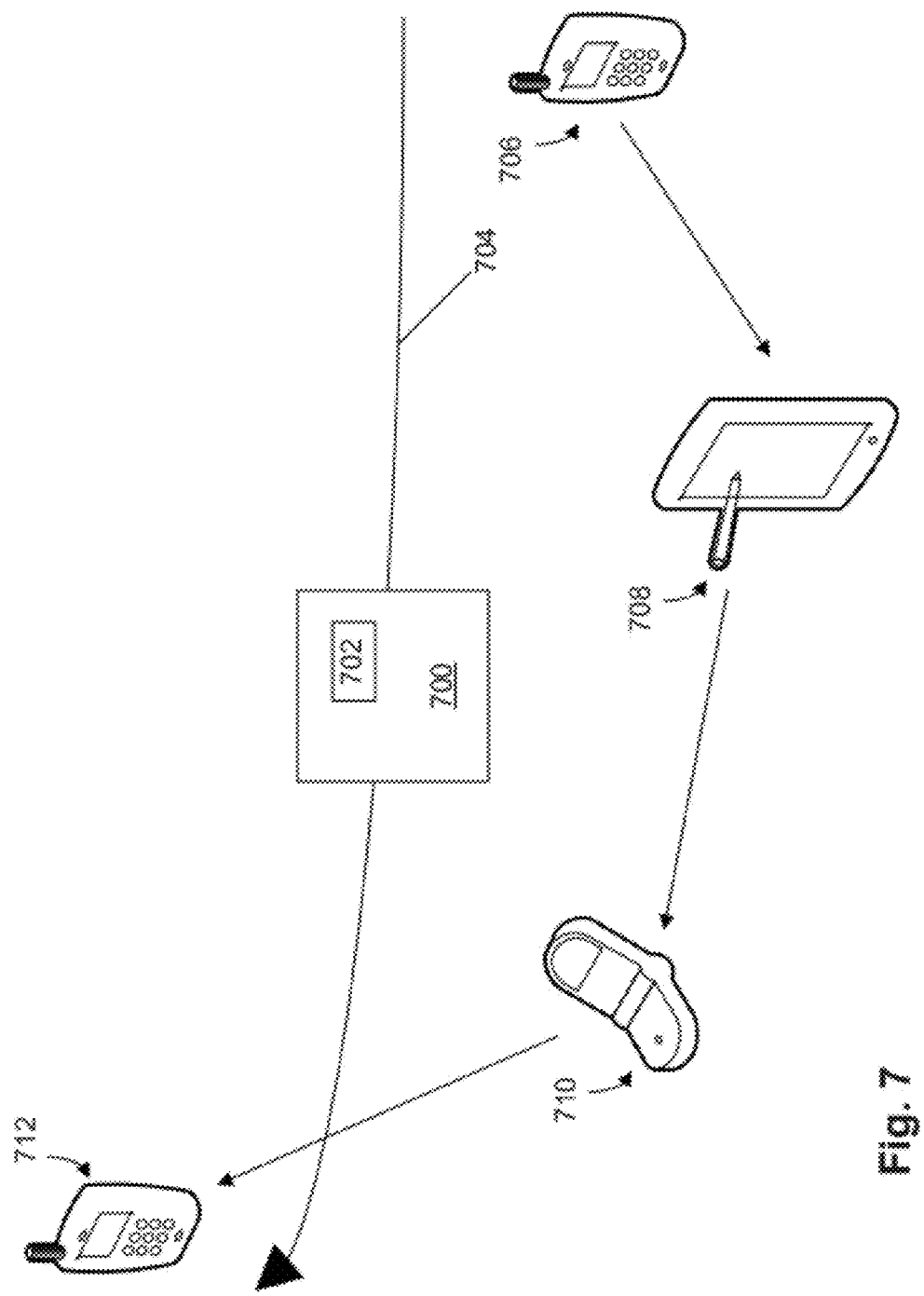
FIG. 7 illustrates an object with an RFID tag as it may be tracked by multiple RFID query devices, in accordance with various embodiments.

FIG. 7 illustrates an object 700 with an RFID tag 702 travelling along a path 704. The travel of the object may be tracked by a plurality of portable devices 706-712. As shown in FIG. 7, various types of portable devices may be used for tracking, including but not limited to smart phones 706 and 712, tablet computer(s) 708, other types of mobile phones (e.g., 710), as well as other devices not shown in FIG. 7, including but not limited to cameras, portable GPS units, pagers, radios used by emergency personnel such as police officers and firefighters, and so forth. In various embodiments, portable devices 706-712 each may include a processor, memory operably coupled to the processor, and a control module to be operated by the processor to cooperate with one or more of the other similarly-equipped portable devices to track movement of an object, such as object 700, having an RFID tag. In various embodiments, the control module of each portable device 706-712 may be configured to facilitate transmission of a query signal to the RFID tag and facilitate reception of a reply signal from the RFID tag. In various embodiments, the reply signal may include RFID data associated with object 700.

In various embodiments, an apparatus, such as a server (not shown) in communication with the plurality of portable devices 706-712, may be configured to receive, from one or more RFID query devices such as plurality of portable devices 706-712, data including a plurality of tuples. In various embodiments, each tuple may include RFID data associated with an object and a geographic coordinate of the object. In various embodiments, each received tuple may further include a timestamp, usable in conjunction with the RFID data associated with the object and the geographic coordinate of the object, to determine that the object was at the geographic coordinate at a time represented by the timestamp. In various embodiments, the server may be configured to track a route such as path 704 travelled by at least one object having an RFID tag, such as object 700, based on these received tuples.

In various embodiments, the server may be configured to calculate a velocity of object 700 based on the received tuples. In various embodiments, the server may be configured to determine whether the at least one object, e.g., object 700, is counterfeit based on the tracked route and/or calculated velocity.

In various embodiments, the control module of an RFID device such as one of portable devices 706-712 may further be configured to hand off tracking of the object to another one of portable devices 706-712. For instance, the control module may be configured to hand over tracking of the object to a first of one or more other devices where the control module determines that the object is closer to the first of the one or more other devices than the device hosting the control module, or that the object has a trajectory towards the first of the one or more other devices.

In various embodiments, the RFID query device such as one of portable devices 706-712 likewise may be configured to take over tracking of the object from a second of the one or more other devices. For example, the control module may be further configured to facilitate transmission of a request to the first of the one or more other devices to take over tracking of the object. In various embodiments, the control module may be configured to take over tracking of the object from the second of the one or more other devices where the control module determines that the object is closer to the device than the second of the one or more other devices. In various embodiments, the control module may additionally or alternatively be configured to take over tracking of the object where the control module receives a communication from the second of the one or more other devices requesting that the device take over tracking of the object.

As another example, multiple RFID query devices may be placed along a road (similar to FIG. 3), and may track passage of a vehicle having an RFID tag as it passes. This information could be particularly useful to authorities in a high-speed chase.

Some embodiments may further be configured to follow the object, with a built-in camera. These embodiments may use triangulation to follow the object.

In some embodiments, an RFID query device may obtain RFID information from a plurality of objects in an area, geographic coordinates of the area and a digital image of the area and, using methods described above, display information to the user about the objects in various ways. For example, smart phone 14 of FIG. 1 may obtain information about each of plurality of objects 10 on the shelves, such as RFID data, a geographic location of the smart phone and digital image data captured by a camera on smart phone 14. Using this information, smart phone 14 and/or other devices may determine information about those objects using database 18, and output the information about the objects to a user in various ways (e.g., visual, audio, olfactory, tactile, etc.), as described above. In some embodiments, objects may be selectively displayed (or otherwise output) to the user based on whether their RFID tags have sufficient signal strength and whether the objects are identified as being visible or in the foreground. The geographic coordinates may be used to determine an appropriate price for each object (e.g., orange juice may be cheaper in Florida than Alaska). The geographic coordinates may also be used to determine which hyperlinks to associate with portions of captured digital image data. For example, if smart phone 14 is located in a Spanish-speaking country such as Mexico, smart phone 14 or another device may choose hyperlinks, for association with portions of captured image data, that lead to Spanish-language websites.

In various embodiments, a secure token may be created and stored in and/or transmitted by an RFID tag. The secure token may provide secure numerical access codes for various cryptographic schemes, such as public-key encryption, using various algorithms. One example algorithm used in public key cryptography is the Rivest, Shamir and Adleman ("RSA") encryption algorithm described in U.S. Pat. No. 4,405,829 for a "Cryptographic communications system and method," the entire content of which is incorporated by reference for all purposes. Secure tokens may be used in other technologies as well, such as the KeeLoq block cipher used in automobile systems.

A secure token stored in an RFID tag may be implemented in various applications, such as banking, network access, and/or other applications requiring secure access. An RFID tag may be embodied with or coupled with a device configured to generate the secure token. The secure token may then be used to gain access to a location or electronic network, etc., but with increased security using an encrypted signal.

Figure 8:
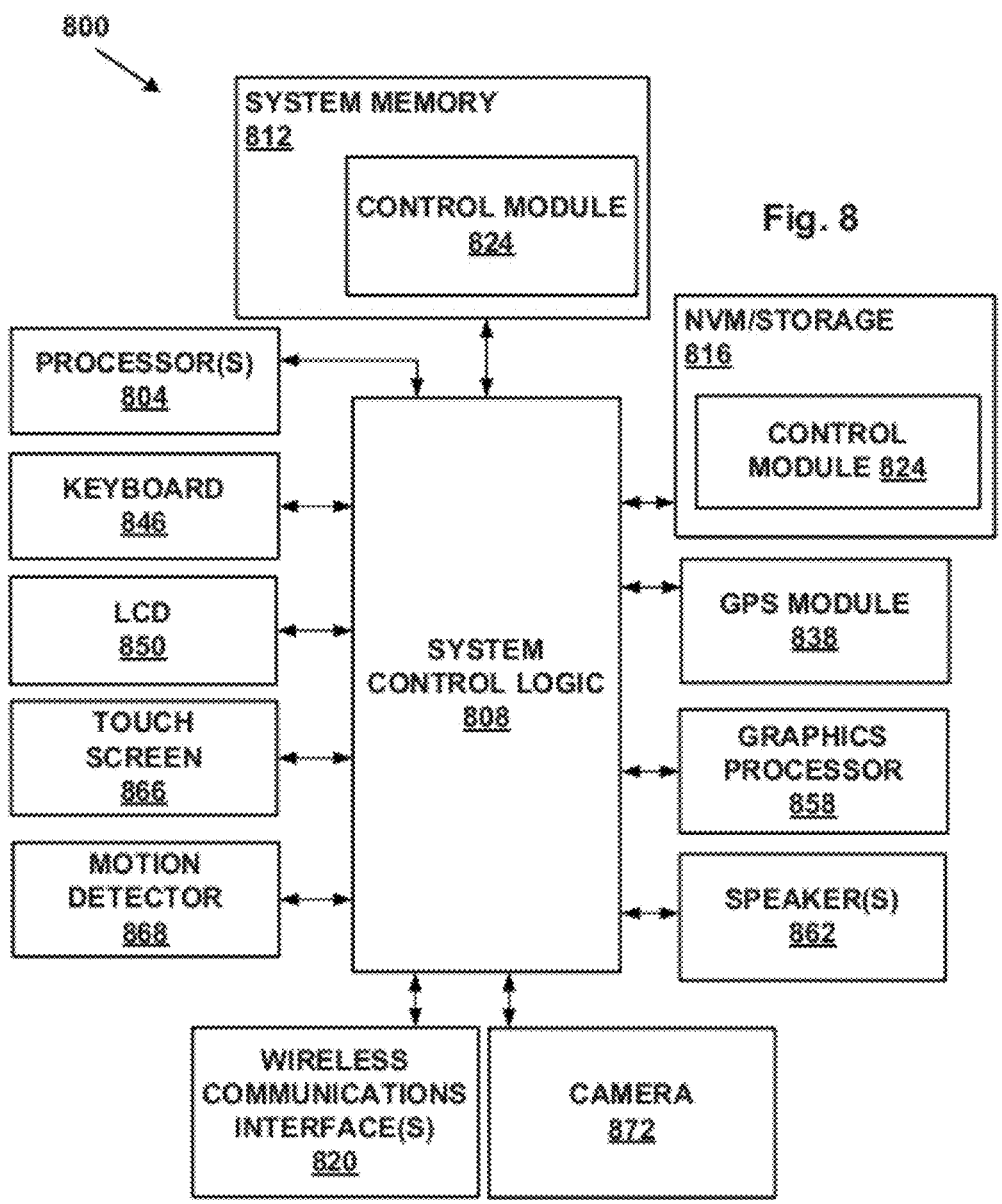
FIG. 8 schematically depicts an example system, in accordance with various embodiments.

The techniques and apparatuses described herein may be implemented into a system using suitable hardware and/or software to configure as desired. FIG. 8 illustrates, for one embodiment, an example system 800 comprising one or more processor(s) 804, system control logic 808 coupled to at least one of the processor(s) 804, system memory 812 coupled to system control logic 808, non-volatile memory (NVM)/storage 816 coupled to system control logic 808, and one or more wireless communications interface(s) 820 coupled to system control logic 808.

System control logic 808 for one embodiment may include any suitable interface controllers to provide for any suitable interface to at least one of the processor(s) 804 and/or to any suitable device or component in communication with system control logic 808.

System control logic 808 for one embodiment may include one or more memory controller(s) to provide an interface to system memory 812. System memory 812 may be used to load and store data and/or instructions, for example, for system 800. System memory 812 for one embodiment may include any suitable volatile memory, such as suitable dynamic random access memory ("DRAM"), for example.

System control logic 808 for one embodiment may include one or more input/output ("I/O") controller(s) to provide an interface to NVM/storage 816 and wireless communications interface(s) 820.

NVM/storage 816 may be used to store data and/or instructions, for example. NVM/storage 816 may include any suitable non-volatile memory, such as flash memory, for example, and/or may include any suitable non-volatile storage device(s), such as one or more hard disk drive(s) ("HDD(s)"), one or more solid-state drive(s), one or more compact disc ("CD") drive(s), and/or one or more digital versatile disc ("DVD") drive(s) for example.

The NVM/storage 816 may include a storage resource physically part of a device on which the system 800 is installed or it may be accessible by, but not necessarily a part of, the device. For example, the NVM/storage 816 may be accessed over a network via the wireless communications interface(s) 820.

System memory 812 and NVM/storage 816 may include, in particular, temporal and persistent copies of a control module, respectively. The control module 824 may include instructions that when executed by at least one of the processor(s) 804 result in the system 800 transmitting and/or receiving RFID signals, as well as performing actions based on received RFID data and/or data provided by other components, as described above. In some embodiments, the control module 824 may additionally/alternatively be located in the system control logic 808.

Wireless communications interface(s) 820 may provide an interface for system 800 to communicate with any other suitable device. Wireless communications interface(s) 820 may include any suitable hardware and/or firmware, such as one or more RFID antenna(s) and/or NFC components.

For one embodiment, at least one of the processor(s) 804 may be packaged together with logic for one or more controller(s) of system control logic 808. For one embodiment, at least one of the processor(s) 804 may be packaged together with logic for one or more controllers of system control logic 808 to form a System in Package ("SiP"). For one embodiment, at least one of the processor(s) 804 may be integrated on the same die with logic for one or more controller(s) of system control logic 808. For one embodiment, at least one of the processor(s) 804 may be integrated on the same die with logic for one or more controller(s) of system control logic 808 to form a System on Chip ("SoC").

The system 800 may be an RFID query device such as smart phone 14 in FIG. 1, a desktop or laptop computer, a tablet computer system, a set-top box, a game console, or any other device adapted to transmit or receive an RFID signal. In various embodiments, system 800 may have more or less components, and/or different architectures. For example, in FIG. 8, system 800 includes a GPS module 838 to determine a location of system 800, a keyboard 846, a liquid crystal display ("LCD") screen 850, a graphics processor 858, speakers 862, a touch screen 866 (which in some cases may be the same as LCD display 850), a motion detector 868 (e.g., vibration detector, infrared scope, body heat detector, motion-detecting camera, etc.) and a camera 872 that may be operated by the processor to capture digital image data for storage in NVM/storage 816.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A device, comprising:
   a processor;
   memory operably coupled to the processor;
   a digital camera operably coupled to the processor;
   a control module to be operated by the processor and configured to:
   facilitate transmission of a query signal to a plurality of radio frequency identification ("RFID") tags associated with a plurality of objects;
   facilitate reception of a plurality of reply signals from the plurality of RFID tags;
   determine information about one or more of the plurality of objects based on RFID data contained in one or more of the plurality of reply signals;
   cause the digital camera to capture digital image data;
   facilitate association of a portion of the captured digital image data with at least one datum of the RFID data;

identify one or more objects in the captured digital image data; and discard RFID data received in RFID reply signals from RFID tags on objects that are not identified in the captured digital image data.

2. The device of claim 1, further comprising an antenna configured to transmit and receive the query and reply signals.

3. The device of claim 1, wherein the control module is further configured to:

facilitate selection of an output based at least in part on the RFID data; and facilitate output of the selected output, on an output component of the device or on an output component of another device.

4. The device of claim 3, wherein the output is selected based at least in part on a commonality identified between the plurality of objects.

5. The device of claim 4, wherein the selected output is a targeted advertisement.

6. The device of claim 3, wherein the output component is an electronic display or speaker of the device.

7. The device of claim 3, wherein the output component is separate from the device.

8. The device of claim 1, wherein the control module is further configured to identify a strongest reply signal of the plurality of reply signals and determine information about one of the plurality of objects having an RFID tag that produces the strongest reply signal.

9. The device of claim 1, wherein the control module is further configured to associate a hyperlink with the portion of the captured digital image data, the hyperlink based at least in part on the determined information.

10. The device of claim 1, further comprising a global positioning system ("GPS") component operably coupled to the processor;

wherein the control module is configured to associate a geographic coordinate obtained by the GPS component with at least one datum of the RFID data.

11. A computer-readable, non-transitory storage medium having stored therein a plurality of instructions configured to cause an apparatus, in response to execution of the instructions by the apparatus, to perform the operations of:

transmitting a radio frequency identification ("RFID") query signal to a plurality of RFID tags associated with a plurality of objects;

receiving a plurality of reply signals from the plurality of RFID tags;

facilitating determination of information about one of the plurality of objects based on RFID data contained in one or more of the plurality of reply signals;

capturing digital image data with a digital camera of the apparatus;

facilitating association of a portion of the captured digital image data with at least one datum of the RFID data;

identifying one or more objects in the captured digital image data; and discarding RFID data received in RFID reply signals from RFID tags on objects that are not identified in the captured digital image data.

12. The computer-readable, non-transitory storage medium of claim 11, wherein the instructions are further configured to cause the apparatus to perform the operations of:

facilitating selection of an output based at least in part on the RFID data; and facilitating output of the selected output, on an output component of the apparatus or on another output component.

13. The computer-readable, non-transitory storage medium of claim 12, wherein the output is selected based at least in part on a commonality identified between the plurality of objects.

14. The computer-readable, non-transitory storage medium of claim 13, wherein the selected output is a targeted advertisement.

15. The computer-readable, non-transitory storage medium of claim 11, wherein the instructions are further configured to cause the apparatus to perform the operations of:

associating a hyperlink with the portion of the captured digital image data, the hyperlink based at least in part on the determined information.

* * * * *